(12) United States Patent
Oyaski

(10) Patent No.: US 6,684,972 B2
(45) Date of Patent: Feb. 3, 2004

(54) APPARATUS TO ENSURE USE OF VEHICLE SEAT BELT

(76) Inventor: Michael F. Oyaski, 207 E. Highland Ave., Ebensburg, PA (US) 15931

( * ) Notice: Subject to any disclaimer, the term of this patent is extended or adjusted under 35 U.S.C. 154(b) by 24 days.

(21) Appl. No.: 09/728,834

(22) Filed: Nov. 30, 2000

(65) Prior Publication Data

US 2002/0063009 A1 May 30, 2002

(51) Int. Cl.[7] .................................................. B60R 21/00
(52) U.S. Cl. ..................... 180/268; 73/862.01; 180/269; 180/286
(58) Field of Search ................................. 180/268, 286; 73/862.01

(56) References Cited

U.S. PATENT DOCUMENTS 3,770,919 A * 11/1973 Lewis .......................... 180/268
6,059,066 A * 5/2000 Lary ........................... 180/268
6,224,095 B1 * 5/2001 Schifflechner et al. ....... 280/735

FOREIGN PATENT DOCUMENTS

GB          1467694      *  3/1977    ................ 180/268

* cited by examiner

*Primary Examiner*—Eric Culbreth
(74) *Attorney, Agent, or Firm*—James Ray & Associates

(57) ABSTRACT

An apparatus to ensure use of seat belts in motor vehicles comprises a first transmitter transmits a signal when a seat is occupied. A second transmitter transmits a signal that such seat belt is unlatched or latched. A third transmitter receives such signal and transmits a signal when such seat belt is latched but does not encircle such occupant. A fourth transmitter receives the signal indicating a seat is occupied enabling it to transmit a signal when it is activated by also receiving the signal indicating that such seat belt corresponding to an occupied seat is unlatched and the signal that such seat belt is latched but does not encircle such occupant. A disabling unit is connected to receive the signal, for preventing gear engagement when it receives the signal indicating a seat belt corresponding to an occupied seat is unlatched and latched but does not encircle such passenger.

21 Claims, 5 Drawing Sheets

APPARATUS TO ENSURE USE OF VEHICLE SEAT BELT

FIELD OF THE INVENTION

The present invention relates, in general, to seat belts used in motor vehicles and, more particularly, this invention relates to a method of and an apparatus for preventing a driver of a motor vehicle from operating such motor vehicle unless such seat belts for each occupant in such motor vehicle are properly fastened.

BACKGROUND OF THE INVENTION

The use of seat belts in automobiles and other motor vehicles has increased throughout the years. As governmental, insurance and safety agencies have continually informed the public of the number of lives that the use of seat belts have saved, the message seems to be getting through to a significantly large portion of the public.

However, there still appears to be a significant segment of the driving population that ignores this one rather simple means of saving lives and reducing the severity of injuries that can occur from automobile accidents. Even legislation that requires the use of seat belts by all occupants of a motor vehicle continues to be ignored by an alarming number of people operating and riding in motor vehicles. However, as with many laws such as these, this type of law is very difficult to enforce because it is not something that is readily apparent to the various law enforcement agencies who must enforce these laws.

With many of the various state legislated laws requiring seat belt use one major problem that exists is that the only way that this law can be enforced is when the vehicle is stopped for another violation or if the vehicle is involved in an accident and it is noted that seat belts were not in use. Unfortunately, in many cases this is much too late to do any good for the people that may be involved in the accident. What is needed is a fool proof way of ensuring that the seat belts are properly latched around the occupants of a motor vehicle before that vehicle can be driven, thereby, guaranteeing that seat belts are in place even for those persons that might choose to ignore the law.

SUMMARY OF THE INVENTION

Therefore, the present invention provides an apparatus to ensure use of seat belts in a motor vehicle. The apparatus comprises a first means disposed in a first predetermined location in such motor vehicle for generating and transmitting a first signal when an occupant is detected in a seat. A second means is disposed in a second predetermined location for generating and transmitting a second signal representative of such seat belt being one of unlatched and latched. There is a third means disposed in a third predetermined location for receiving such second signal and for generating and transmitting a third signal such that when such seat belt, detected as being latched by the second means, one of extends sufficiently and insufficiently to encircle such occupant of such motor vehicle.

A fourth means is disposed in a fourth predetermined location on such motor vehicle for receiving the first signal indicating such presence of such occupant in such seat of such motor vehicle thereby enabling such fourth means to generate and transmit a fourth signal when such fourth means is activated by also receiving one of the second signal indicating that such seat belt corresponding to such presence of such occupant in such seat of such motor vehicle is unlatched and the third signal indicating that such seat belt is latched but extends insufficiently to encircle such occupant. There is a disabling unit disposed in a fifth predetermined location on such motor vehicle connected to receive the fourth signal for preventing gear engagement in such motor vehicle when the disabling unit receives the fourth signal indicating that a seat belt corresponding to an occupied seat in such motor vehicle is one of unlatched and latched but not extending sufficiently to encircle such passenger.

In a second embodiment of the invention there is provided in combination with a seat belt system for use in a motor vehicle, the improvement for such seat belt system comprising a first means disposed in a first predetermined location in such motor vehicle for generating and transmitting a first signal when an occupant is detected in a seat. A second means is disposed on one of a female and a male portion of each seat belt in such motor vehicle for generating and transmitting a second signal representative of such seat belt being one of unlatched and latched and a third means is disposed on a male portion of each seat belt closely adjacent the end of such seat belt that engages the female portion of such seat belt for receiving the second signal and for generating and transmitting a third signal so that when such seat belt, detected as being latched by the second means, one of extends sufficiently and insufficiently to encircle such occupant of such motor vehicle. There is a fourth means disposed in a second predetermined location on such motor vehicle for receiving such first signal indicating such presence of such occupant in such seat of such motor vehicle thereby enabling such fourth means to generate and transmit a fourth signal when such fourth means is activated by also receiving one of such second signal indicating that such seat belt corresponding to such presence of such occupant in such seat of such motor vehicle is unlatched and the third signal indicating that such seat belt is latched but extends insufficiently to encircle such occupant. A disabling unit is disposed in a third predetermined location on such motor vehicle connected to receive the fourth signal for preventing gear engagement in such motor vehicle when the disabling unit receives the fourth signal indicating that a seat belt corresponding to an occupied seat in such motor vehicle is one of unlatched and latched but not extending sufficiently to encircle such passenger.

OBJECTS OF THE INVENTION

It is, therefore, one of the primary objects of the present invention to provide a means and an apparatus that will ensure that all seat belts corresponding to occupied seats in a motor vehicle are engaged.

It is another object of the present invention to provide a means of preventing a gear shift lever from being moved to a position which would permit such motor vehicle to move in any direction when seat belts are detected as being unlatched.

It is still another object of the present invention to provide a means for detecting the presence of an occupant in any seat of such motor vehicle.

Another object of the present invention is to provide a means for determining that such seat belt though latched is sufficiently extended so as to encircle an occupant.

Yet another object of the present invention is to provide an improvement in the present seat belt system wherein such modifications to seat belts could be made for ensuring that seat belts are properly latched before such vehicle can be operated.

In addition to the numerous objects and advantages of the present invention which have been described with some degree of particularity above, it should be both noted and understood that a number of other important objects and advantages of the method and apparatus for enforcing seat belt usage in motor vehicles will become more readily apparent to those persons who are skilled in the relevant art from the following more detailed description of the invention, particularly, when such detailed description is taken in conjunction with the attached drawing Figures and the appended claims.

BRIEF DESCRIPTION OF THE DRAWINGS

FIG. 8a is a diagram of yet another embodiment of the means for determining seat belt travel.

FIG. 8b is a view of an opaque disc used in the embodiment shown in FIG. 8a.

BRIEF DESCRIPTION OF THE PRESENTLY PREFERRED AND VARIOUS ALTERNATE EMBODIMENTS OF THE INVENTION

Figure 1:
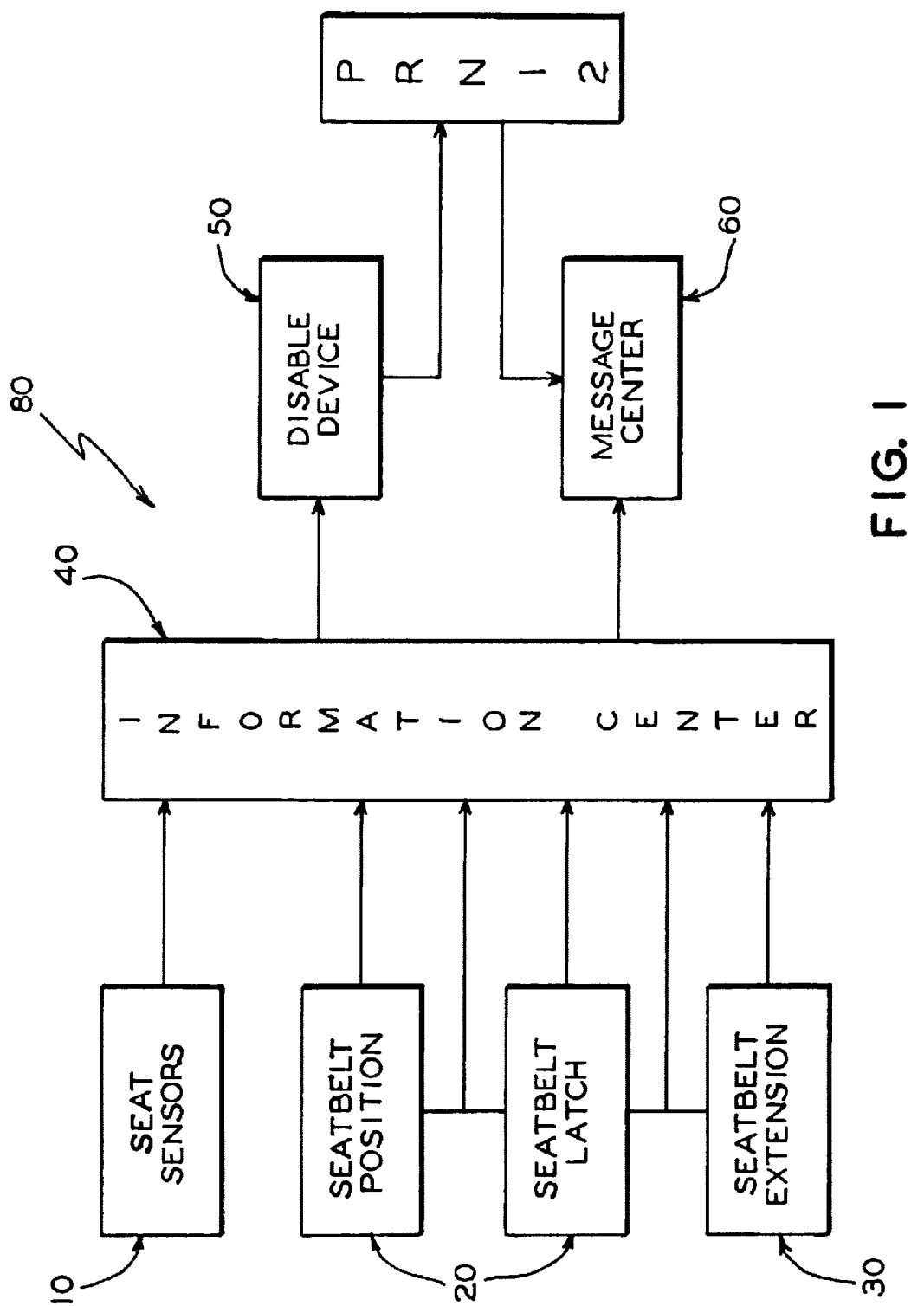
FIG. 1 is a block diagram of a presently preferred embodiment of the invention for ensuring seat belt usage in a motor vehicle.
Figure 2:
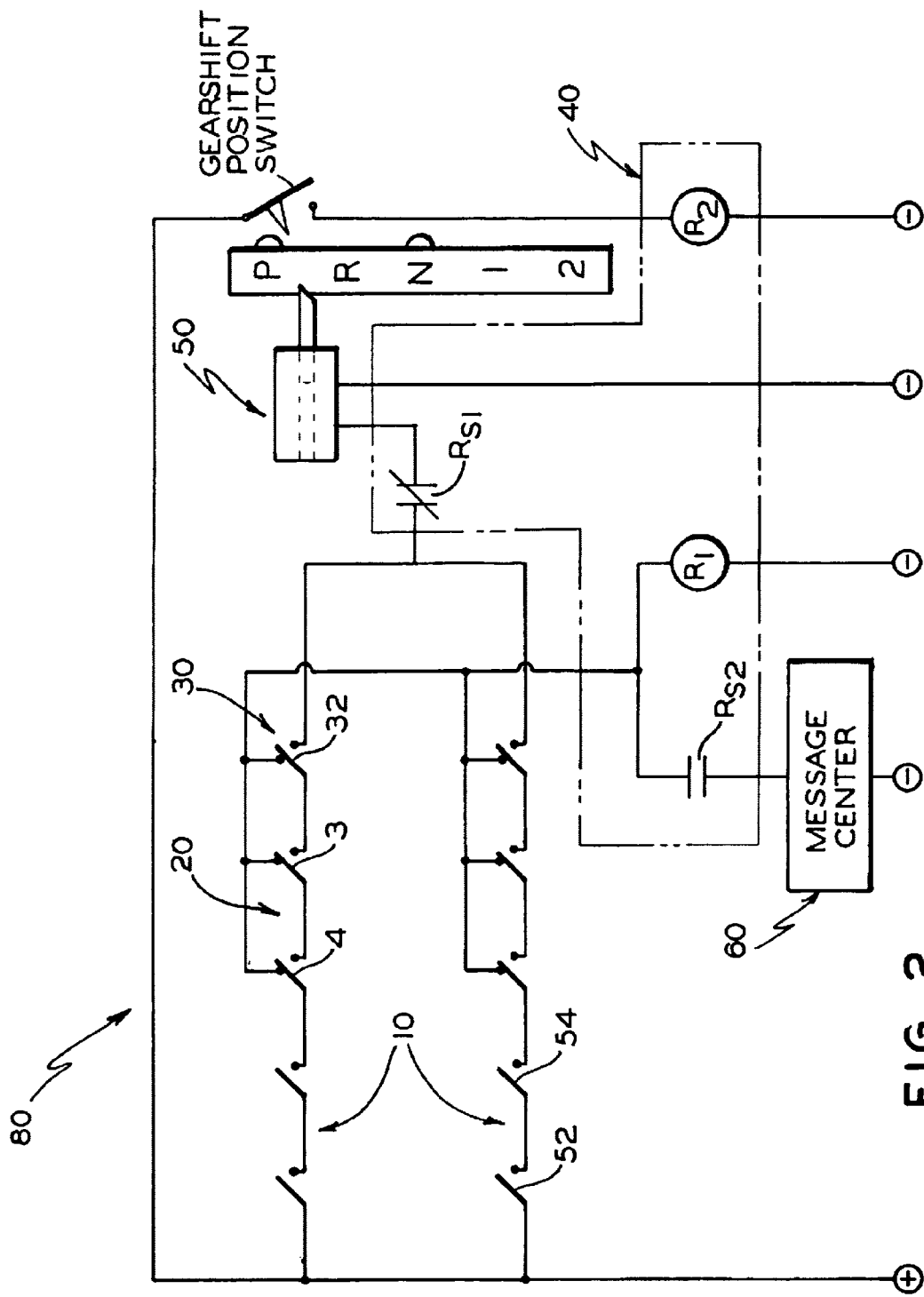
FIG. 2 is a schematic diagram of the block diagram of FIG. 1.

Reference is now made to FIGS. 1 and 2. Illustrated therein is a block diagram and a schematic diagram of a first embodiment of the invention for a method and apparatus which would ensure seat belt usage in a motor vehicle.

Such apparatus, generally designated 80, used to ensure use of seat belts in a motor vehicle, comprises a first means, generally designated 10, disposed in a first predetermined location in such motor vehicle (not shown) for generating and transmitting a first signal when an occupant is detected in a seat. Such first means 10 would include a detection device 52 in each seat of the motor vehicle. Such detection device 54 could also be disposed on each seat back. Such first means 10 would transmit a signal when an occupant is detected. Occupant or passenger as used in this disclosure is intended to include the driver and is meant to include anyone in the motor vehicle.

There is a second means, generally designated 20, disposed in a second predetermined location for generating and transmitting a second signal representative of such seat belt being one of unlatched and latched. Such second means 20 transmits such second signal indicating that the seat belt for a seat in which an occupant is positioned is latched or unlatched. A third means, generally designated 30, is disposed in a third predetermined location for receiving the second signal and for generating and transmitting a third signal when such seat belt, that was detected as being latched by the second means, does not extend a sufficient distance so to encircle such occupant of that seat of such motor vehicle. The third means 30 is used to prevent an occupant from engaging the seat belt but not putting it around himself or herself. This was a common practice from some people with the earlier seat belts who did not like seat belts. Such practice is not as prevalent with today's seat belts with the shoulder strap as this becomes more inconvenient and uncomfortable. However, such third means 30 prevents anyone from using this practice.

A fourth means, generally designated 40, is disposed in a fourth predetermined location on such motor vehicle. Such fourth means 40, also referred to as an information center, acts as an and/or gate for receiving said first signal indicating such presence of such occupant in such seat of such motor vehicle thereby enabling such fourth means 40 to generate and transmit a fourth signal when the fourth means 40 is activated by also receiving one of such second signal indicating that such seat belt corresponding to such presence of such occupant in such seat of such motor vehicle is unlatched and also the third signal which indicates that such seat belt is latched but does not extend a sufficient distance to encircle such occupant.

Such apparatus 80 includes a disabling means, generally designated 50, that is disposed in a fifth predetermined location on such motor vehicle and is connected to receive the fourth signal. Such disabling means 50 prevents gear engagement in such motor vehicle when such disabling means 50 receives the fourth signal indicating that a seat belt corresponding to an occupied seat in such motor vehicle is one of unlatched and latched but not extending sufficiently to encircle such passenger. Thus, the disabling means would prevent a driver from moving the gear shift lever to a gear which would permit the vehicle to move in any direction as long as there is an indication that either a seat belt corresponding to an occupied seat is not latched or is latched but does not extend around the occupant.

In an alternate embodiment of the invention such second predetermined location is in one of a male and a female portion of such seat belts. Such second means 20 includes at least one of a photocell, microswitch, infrared detector, ultrasonic detector and a magnetic reed switch. It is presently preferred that such detection means be a photocell. It is also presently preferred that such first predetermined location would include all seats and seat backs in such motor vehicle so that the presence of an occupant is ensured.

Another embodiment of the invention provides an improvement of the seat belt system. Thus, in combination with a seat belt system in motor vehicles, the improvement comprises a first means 10 disposed in a first predetermined location in such motor vehicle for generating and transmitting a first signal when an occupant is detected in a seat. There is a second means 20 disposed on one of the female and the male portion of each seat belt in such motor vehicle for generating and transmitting a second signal representative of such seat belt being one of unlatched and latched. A third means 30 is disposed on a male portion 28 of each seat belt closely adjacent the end of such seat belt that engages the female portion of such seat belt for receiving the second signal and for generating and transmitting a third signal when such seat belt, that was detected as being latched by the second means 20, does not extend a sufficient distance so as to encircle such occupant sitting in the seat of such motor vehicle.

A fourth means 40, also referred to as an information center, is disposed in a second predetermined location on such motor vehicle for receiving the first signal indicating a presence of such occupant in such seat of such motor vehicle thereby enabling the fourth means to generate and transmit a fourth signal when the fourth means is activated by also receiving one of such second signal indicating that such seat belt corresponding to a presence of an occupant in such seat of such motor vehicle is one of latched and unlatched and the third signal that indicates that such seat belt is latched but does not extend sufficiently to encircle the occupant. The improvement further includes a disabling means 50 that is disposed in a third predetermined location on such motor vehicle and is connected to receive said fourth signal. Such disabling means 50 prevents a driver from moving the gear shift lever to a gear which would permit such motor vehicle to move in any direction when the disabling means 50 receives the fourth signal that indicates that a seat belt corresponding to an occupied seat in such motor vehicle is either unlatched or latched but does not extend sufficiently to encircle such passenger.

An alternate embodiment of the invention further includes a fifth means, generally designated 60, for detecting that a seat belt has been unlatched after such gear shift lever had been moved to a position which would enable such motor vehicle to move in any direction. Such fifth means 60 is also called a message center and further includes a playback unit that would that would recite a recorded message to warn such occupants of such motor vehicle that if such unlatched seat belt was not relatched within a predetermined period of time that the unit would broadcast the recorded message louder and louder until such seat belt was relatched.

Figure 3:
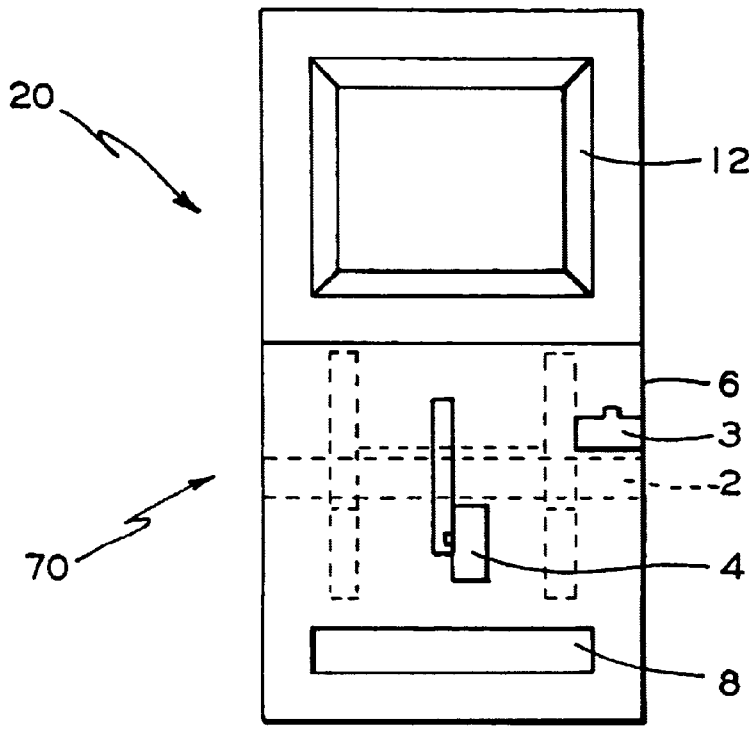
FIG. 3 shows a diagram of the female portion of a seat belt according to an alternate embodiment of the invention.
Figure 4A:
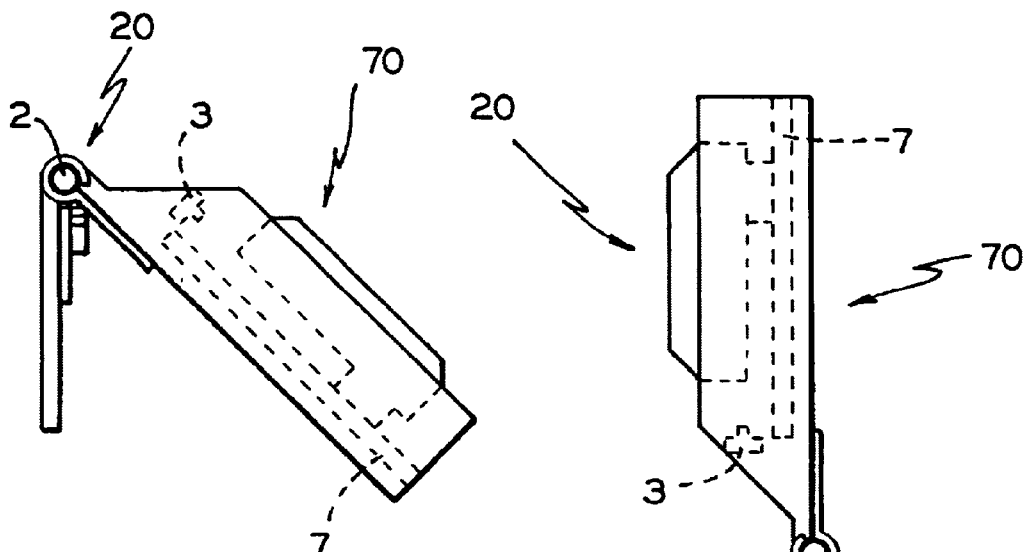
FIGS. 4a and 4b shows a seat belt of FIG. 2 in a home and latched position.
Figure 4B:
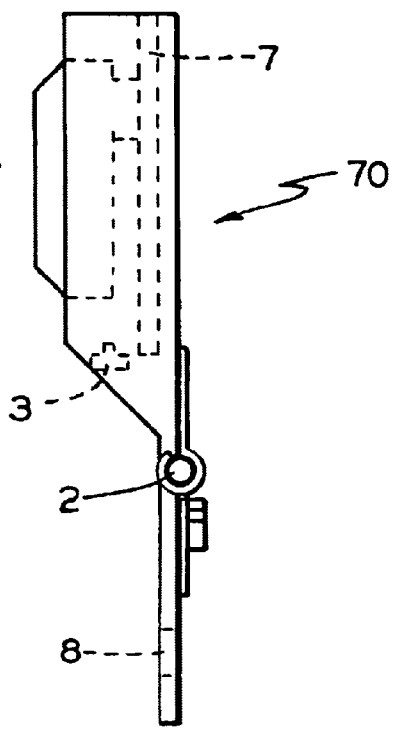

Reference is now made to FIGS. 3, 4a and 4b. Illustrated therein is a modification of a female portion, generally designated 70, according to second means 20, of a seat belt to ensure seat belt usage. Such female portion 70 has a hinge pin 2 for permitting the female portion 70 to move from a home position to a latched position and a slot B for securing the belt. There is a microswitch 4 and a cam portion 6 to detect that such male portion of the seat belt (not shown in FIGS. 3, 4a and 4b) is secured in slot 8 and a latch button 12 for releasing the male portion of the seat belt. A microswitch 4 and cam portion is mentioned as the detection device; however, such detection device could be selected from a photocell and an infrared device. FIG. 4a shows the female portion 20 in a home position while FIG. 4b shows the belt in a latched position.

Figure 5:
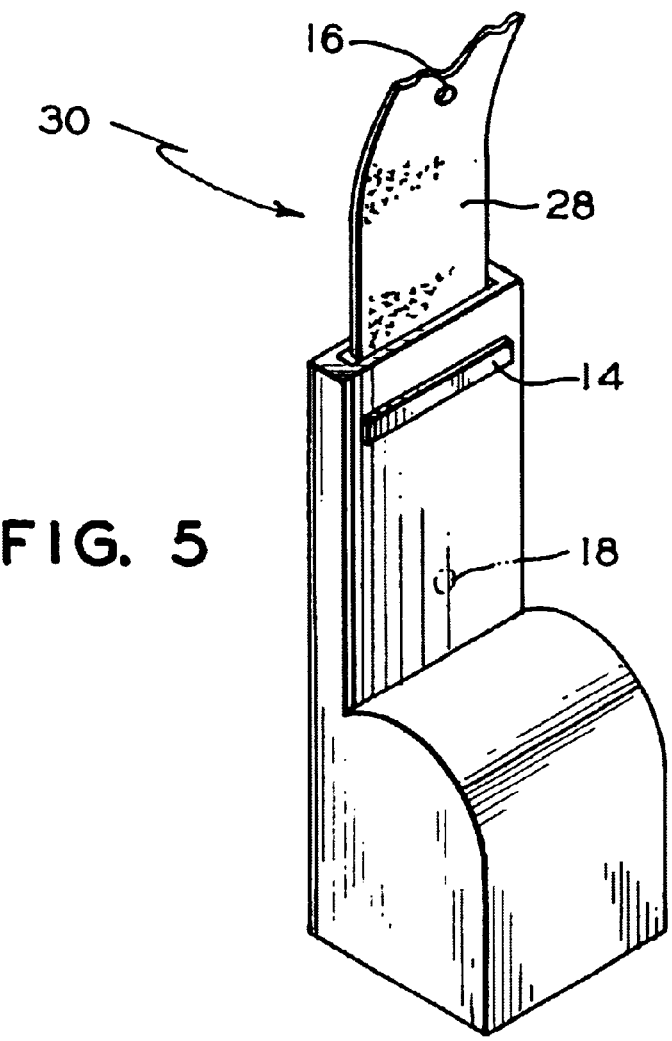
FIG. 5 is a diagram of a movable portion of a seat belt according to still another embodiment of the invention.
Figure 6:
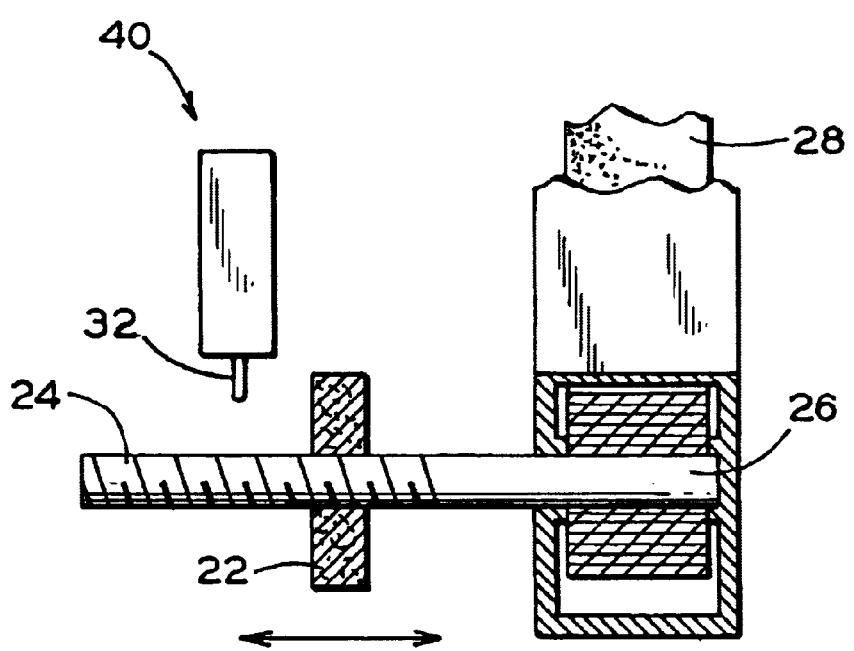
FIG. 6 is a diagram of one embodiment of a means for determining seat belt travel.
Figure 7:
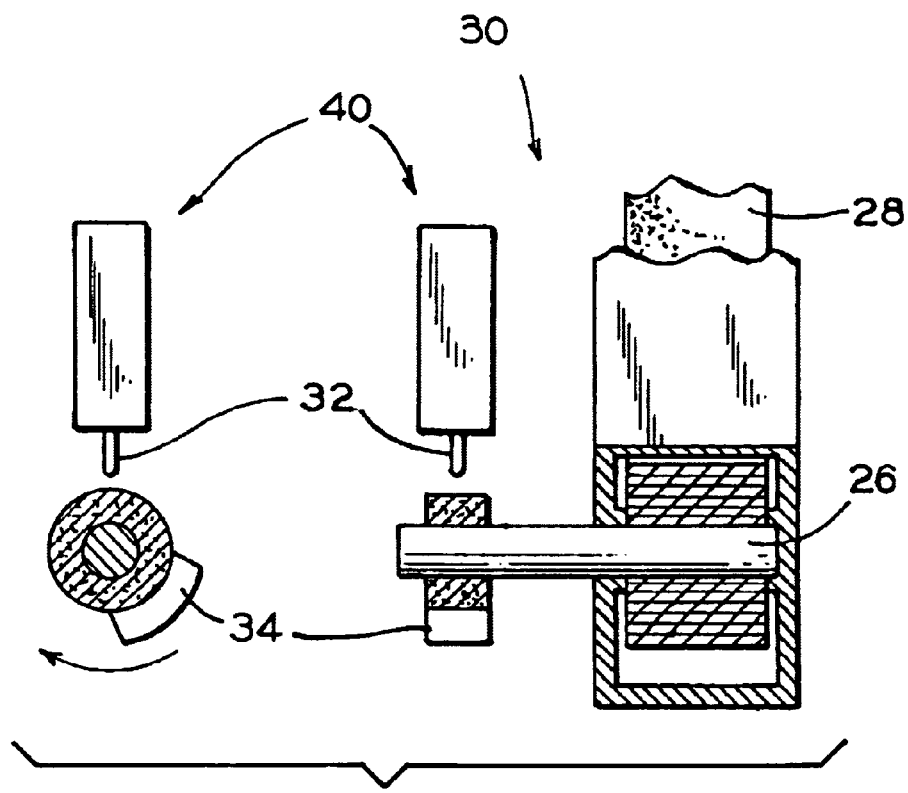
FIG. 7 is a diagram of another embodiment of a means for determining seat belt travel.
Figures 8A, 8B:
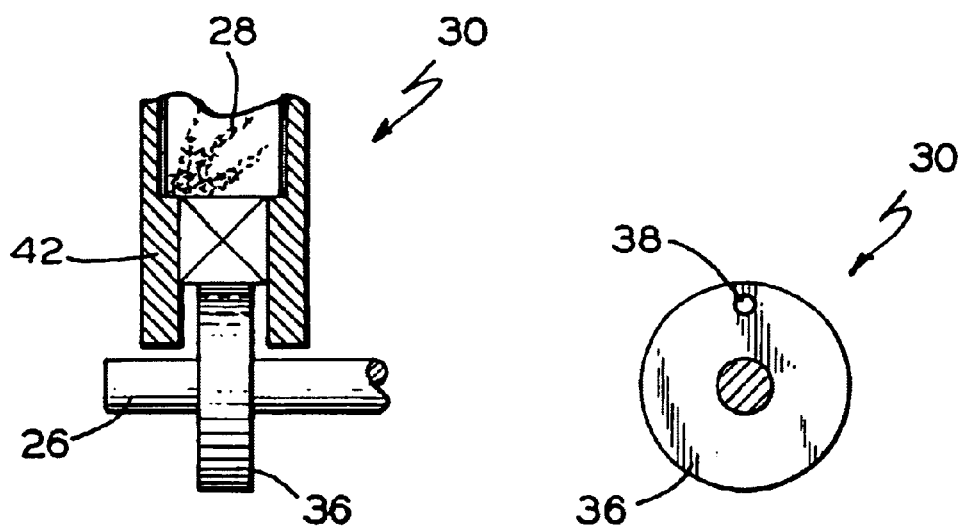

Illustrated in FIG. 5 is a male portion 28 of such third means 30, of a seat belt system. Such third means 30 has a detection device 14. Such detection device 14 is selected from a photocell, infrared detector, ultrasonic detector, magnetic reed and a microswitch. Such third means 30 has a locating member 16. When the male portion 28 is retracted such locating member 16 is at home position 18. When the male portion 28 is extended as shown in FIG. 5 the locating member 16 indicates that the male portion 28 has been uncoiled at least 8 inches and the location detection device 14 would be activated and would indicate that the male portion 28 has been extended sufficiently.

Reference is now made to FIGS. 6, 7, 8a and 8b. Illustrated therein are various embodiments for the third means 30 for determining travel of the movable portion of the seat belt 28 so as to insure it has traveled sufficiently to encircle an occupant.

In one embodiment of the invention a non-conductible cam 22 is disposed on threaded spindle 24 that is connected to the recoil shaft 26 of the seat belt 28. The threaded spindle 24 may be a separate part or it is preferred that it is simply a threaded portion of the seat belt shaft 26. As the movable portion of the seat belt 28 is extended outward, the threaded spindle 24 rotates causing the cam 22, which is designed so that it cannot rotate, to move laterally away from the seat belt housing until it contacts a switch 32. It would require one full revolution of the such seat belt shaft 26 to cause the cam 22 to move sufficiently in a lateral direction to contact the switch 32. One full revolution of the seat belt shaft 26 would entail movement of the seat belt 28 for approximately four inches. When the switch 32 is tripped by the action of the cam 22 resulting from movement of the male portion of the seat belt 28, the signal that was sent out indicating that the seat belt 28 had not moved sufficiently to encircle an individual would cease and would thus enable such gear shift lever of such automobile to be engaged. This is provided that such signal from such means indicating that a seat belt in an occupied seat was also engaged is also stopped. When the male portion of seat belt 28 is disengaged and the movable portion of the seat belt 28 is retracted to its housing the threaded spindle 24 to which the cam 22 is connected would rotate in the opposite direction causing the cam 22 to return to its original position and since it is disengaged from the switch 32 a signal would again be emitted indicating that the male portion of the seat belt 28 is not extended sufficiently.

In this embodiment it is possible that, instead of such switch 32 that is tripped by the cam 22, an infrared or photocell detector can be used to detect that such cam 22 has moved laterally to its extended position. If either an infrared or photocell detector is used than there is no necessity for such cam 22 to be made of a non-conductive material and, thus, virtually any material could be used.

In an alternate embodiment the cam 34, connected to the seat belt shaft 26, would be on a rotating wheel which would rotate one revolution when the seat belt 28 was extended for at least four inches. The cam 34 in this embodiment would similarly trip a switch 32 when the seat belt 28 was moved sufficiently for the cam 34 (rotating wheel) to make one revolution. When the seat belt 28 was retracted such cam 32 would rotate tripping the switch 32 in the opposite direction causing the detector to emit a signal indicating that the seat belt 28 was not extended sufficiently to encircle a person.

In still yet another embodiment an opaque disc 36 is connected to the seat belt shaft 26. As the seat belt 28 is pulled from its retracted position the opaque disc 36 would in turn be rotated. The opaque disc 36 has an aperture 38 in it. As the disc 36 rotates for one complete revolution such aperture 38 is moved to a position in which it activates a detector 42. The detector 42 can be a photocell or an infrared cell. Again the detector 42 is activated when the opaque disc 36 rotates for one revolution which would correspond to the seat belt 28 being moved for approximately four inches. As with the other embodiments when the disc 36 rotates in the opposite direction the detector 42 signals that the seat belt 28 is extended sufficiently to encircle an individual.

In still another variation of the previous embodiment such opaque disc 36 is equipped with a peg instead of an aperture 38. In this instance the peg would contact a switch after the disc was rotated one revolution by such movement of the seat belt.

While a presently preferred embodiment and various alternate embodiments of the present invention has been described in detail above, it should be understood that various other adaptations and/or modifications of the invention can be made by those persons who are particularly skilled in the art related to motor vehicle seat belts without departing from either the spirit of the invention or the scope of the appended claims.

I claim:

1. An apparatus to ensure use of a seat belt in a motor vehicle, said apparatus comprising:
   (a) a first means disposed in a seat portion of such motor vehicle for generating and transmitting a first signal indicative of an occupant seated in a seat;
   (b) a second means disposed at least one of in and on a predetermined portion of such seat belt for generating and transmitting a second signal representative of such seat belt being one of unlatched and latched;
   (c) a third means disposed at least one of adjacent and on such seat belt in a predetermined location and connected to receive said second signal for generating and transmitting a third signal when such seat belt detected as being latched by said second means, extends insufficiently to encircle such occupant of such motor vehicle;
   (c) a fourth means disposed in a predetermined location on such motor vehicle connected to receive said first signal indicating such presence of such occupant in such seat of such motor vehicle thereby enabling said fourth means to generate and transmit a fourth signal when said fourth means is activated by also receiving one of said second signal indicating that such seat belt corresponding to such presence of such occupant in such seat of such motor vehicle is unlatched and said third signal indicating that such seat belt is latched but extends insufficiently to encircle such occupant; and
   (d) a disabling unit disposed in a predetermined location on such motor vehicle connected to receive said fourth signal for preventing gear engagement in such motor vehicle when said disabling unit receives said fourth signal indicating that such seat belt corresponding to an occupied seat in such motor vehicle is one of unlatched and latched but extending insufficiently to encircle such passenger.

2. An apparatus to ensure use of a seat belt in a motor vehicle, according to claim 1, wherein said portion of such seat belt is one of a male and a female portion of such seat belt.

3. An apparatus to ensure use of a seat belt in a motor vehicle, according to claim 2, wherein said portion of such seat belt is a female portion of such seat belt.

4. An apparatus to ensure use of a seat belt in a motor vehicle, according to claim 1, wherein said second means includes one of a photocell, microswitch, infrared detector, ultrasonic detector and a magnetic reed switch.

5. An apparatus to ensure use of a seat belt in a motor vehicle, according to claim 4, wherein said second means is a photocell.

6. An apparatus to ensure use of a seat belt in a motor vehicle, according to claim 1, wherein said first predetermined location would include all seats and seat backs in such motor vehicle.

7. An apparatus to ensure use of a seat belt in a motor vehicle, according to claim 1, wherein said first means is a pressure sensor.

8. An apparatus to ensure use of a seat belt in a motor vehicle, according to claim 1, wherein said apparatus further includes a fifth means for detecting that such seat belt has been unlatched after such gear shift lever had been moved to a position which would enable such motor vehicle to move in any direction.

9. An apparatus to ensure use of a seat belt in a motor vehicle, according to claim 8, wherein said fifth means further includes a recorder that would warn such occupants of such motor vehicle that if such unlatched seat belt was not relatched within a predetermined period of time that said recorder would broadcast a recorded message louder and louder until such seat belt was relatched.

10. An apparatus to ensure use of a seat belt in a motor vehicle, according to claim 1, wherein said third means further includes a cam disposed on a threaded portion of a seat belt shaft for lateral movement for a predetermined distance so as to energize one of a microswitch, a photocell and an infrared detector when such movable portion of such seat belt is extended for a predetermined distance.

11. An apparatus to ensure use of a seat belt in a motor vehicle, according to claim 10, wherein said lateral movement of said cam is detected by a photocell.

12. In combination with a seat belt system for use in a motor vehicle, the improvement for such seat belt system comprising:
   (a) a first means disposed in a first predetermined location in such motor vehicle for generating and transmitting a first signal when an occupant is detected in a seat;
   (b) a second means disposed on one of a female and a male portion of a seat belt in such motor vehicle for generating and transmitting a second signal representative of such seat belt being one of unlatched and latched;
   (c) a third means disposed on a male portion of such seat belt closely adjacent the end of such seat belt that engages said female portion of such seat belt for receiving said second signal and for generating and transmitting a third signal when such seat belt, detected as being latched by said second means, extends insufficiently to encircle such occupant of such motor vehicle;
   (d) a fourth means disposed in a second predetermined location on such motor vehicle for receiving said first signal indicating such presence of such occupant in such seat of such motor vehicle thereby enabling said fourth means to generate and transmit a fourth signal when said fourth means is activated by also receiving one of said second signal indicating that such seat belt corresponding to such presence of such occupant in such seat of such motor vehicle is unlatched and said third signal indicating that such seat belt is latched but extends insufficiently to encircle such occupant; and
   (e) a disabling unit disposed in a third predetermined location on such motor vehicle connected to receive said fourth signal for preventing gear engagement in such motor vehicle when said disabling unit receives said fourth signal indicating that such seat belt corresponding to an occupied seat in such motor vehicle is one of unlatched and latched but extending insufficiently to encircle such passenger.

13. The combination, according to claim 12, wherein said improvement further includes a fifth means for detecting that such seat belt has been unlatched after such gear shift lever had been moved to a position which would enable such motor vehicle to move in any direction.

14. The combination, according to claim 13, wherein said fifth means further includes a recorder that would warn such occupants of such motor vehicle that if such unlatched seat belt was not relatched within a predetermined period of time that said recorder would broadcast a recorded message louder and louder until such seat belt was relatched.

15. The combination, according to claim 12, wherein said seat portion would include all seats and seat backs in such motor vehicle.

16. The combination, according to claim 12, wherein said second means is disposed on a female portion of such seat belt.

17. The combination, according to claim 12, wherein said second means includes one of a photocell, microswitch, infrared detector, ultrasonic detector and a magnetic reed switch.

18. The combination, according to claim 12, wherein said second means is a photocell.

19. The combination, according to claim 12, wherein said first means is a pressure sensor.

20. The combination, according to claim 12, wherein said third means further includes a cam disposed on a threaded portion of such seat belt shaft for lateral movement for a predetermined distance so as to energize one of a microswitch, a photocell and an infrared detector when such movable portion of such seat belt is extended for a predetermined distance.

21. The combination, according to claim 20, wherein said lateral movement of said cam is detected by a photocell.

\* \* \* \* \*